United States Patent [19]

Shimoda et al.

[11] Patent Number: 5,679,469
[45] Date of Patent: Oct. 21, 1997

[54] METALLIZED CERAMIC SUBSTRATE HAVING SMOOTH PLATING LAYER AND METHOD FOR PRODUCING THE SAME

[75] Inventors: Kouhei Shimoda; Hirohiko Nakata, both of Itami, Japan

[73] Assignee: Sumitomo Electric Industries, Ltd., Japan

[21] Appl. No.: 506,898

[22] Filed: Jul. 26, 1995

[30] Foreign Application Priority Data

Aug. 2, 1994 [JP] Japan .................... 6-181310

[51] Int. Cl.$^6$ .................... B32B 15/04; B32B 15/16; B32B 18/00
[52] U.S. Cl. .................... 428/627; 428/548; 428/552; 428/565; 428/569; 428/663; 428/665; 428/672; 428/680; 428/704; 428/901; 427/96; 427/123; 427/126.1; 427/369; 427/376.1; 427/376.3; 427/376.6; 427/383.3; 427/404; 427/419.2
[58] Field of Search .................... 428/615, 544, 428/569, 617, 548, 552, 557, 564, 565, 620, 621, 627, 630, 632, 633, 663, 668, 669, 672, 680, 704, 901, 665; 427/96, 355, 369, 370

[56] References Cited

U.S. PATENT DOCUMENTS

| Re. 34,484 | 12/1993 | Nagashima | 428/621 |
|---|---|---|---|
| 4,567,110 | 1/1986 | Jarvinen | 428/433 |
| 5,010,388 | 4/1991 | Sasame et al. | 357/70 |
| 5,080,980 | 1/1992 | Sakaguchi et al. | 428/610 |
| 5,132,185 | 7/1992 | Iacovangelo | 428/610 |
| 5,134,461 | 7/1992 | Yamakawa et al. | 357/71 |
| 5,146,313 | 9/1992 | Kato et al. | 357/74 |
| 5,256,609 | 10/1993 | Dolbert | 501/96 |
| 5,306,891 | 4/1994 | Fleming et al. | 219/121.64 |

FOREIGN PATENT DOCUMENTS

| 0431606 | 6/1991 | European Pat. Off. . |
|---|---|---|
| 1-272183 | 10/1989 | Japan . |
| 1-301866 | 12/1989 | Japan . |
| 3-193686 | 8/1991 | Japan . |
| 5-238857 | 9/1993 | Japan . |
| 2187205 | 9/1987 | United Kingdom . |

OTHER PUBLICATIONS

Chem Abstracts, 6001 p. 323 Apr. 17, 1989 No. 8.
Chem Abstracts, 6001, p. 342 Mar. 1988, No. 10.
Derwent 89–293424, London, UK, (1 pg.) Dec. 1987.
Chem.Abstracts 6001,p.337 Dec. 25, 1989 No. 26.
Chem.Abstracts, 6001 p.345 Aug. 8, 1988, 109 No. 8.
Derwent Publ. JP60142547—(1 page) Jul. 1985.

*Primary Examiner*—Paul J. Thibodeau
*Assistant Examiner*—Vivian Chen
*Attorney, Agent, or Firm*—Jordan B. Bierman; Bierman, Muserlian and Lucas LLP

[57] ABSTRACT

A metallized ceramic substrate having a smooth plating layer comprises a ceramic substrate containing aluminum nitride as a main component; a tungsten- and/or molybdenum-based metallized layer formed on at least one face of the ceramic substrate; and a nickel-based plating layer formed on the metallized layer wherein the plating layer has a thickness of not greater than 2 μm and a surface roughness (Ra) of not greater than 2 μm. Alternatively, the plating layer on the ceramic substrate may comprise a first nickel-based plating layer having a thickness of not greater than 2 μm and a second gold-based plating layer having a thickness of not greater than 1 μm wherein the gold-based plating layer has a surface roughness (Ra) of 2 μm or less. These metallized substrates are produced by applying a metallizing paste containing tungsten and/or molybdenum onto a green aluminum nitride ceramic substrate, flattening the metallizing paste layer, firing the metallizing paste-coated ceramic substrate, and forming the plating layer or layers.

6 Claims, No Drawings

METALLIZED CERAMIC SUBSTRATE HAVING SMOOTH PLATING LAYER AND METHOD FOR PRODUCING THE SAME

BACKGROUND OF THE INVENTION

1. Field of the Invention

The present invention relates to aluminum nitride ceramics which are extensively used as substrates having high thermal conductivity and favorable heat dissipation properties for electronic materials, such as IC substrates and packaging materials. More specifically, the invention pertains to a metallized aluminum nitride substrate on which electronic parts like ICs, transistors, diodes, and thyristors are mounted, and also to a method for producing such a metallized ceramic substrate.

2. Description of the Related Art

Recently, significant improvements in the properties of semiconductor devices like semiconductor integrated circuits have been made to meet the requirements of high-speed, high-output operations and increased integration density for multi-functions. This leads to a remarkable increase in the amount of heat emitted from these semiconductor devices. In order to allow effective dissipation of heat, materials having high thermal conductivity are required for ceramic substrates with such semiconductor devices mounted thereon. Alumina substrates commonly used as substrates of such semiconductor devices have a relatively low thermal conductivity of approximately 17 W/m·K and a greater coefficient of thermal expansion than that of silicon used as a material of semiconductor elements. The difference in the coefficient of thermal expansion causes poor jointing between the alumina substrates and silicon. Under these circumstances associated with alumina, a noticeable material to use is aluminum nitride (AlN) having a high thermal conductivity of approximately 180 W/m·K and a coefficient of thermal expansion close to that of silicon. This AlN is used as a metallized sintered body for the purpose of joining to the semiconductor elements and the assembly members including lead frames or seal rings, as disclosed in Japanese Patent Laid-Open No. 3-193686.

The metallized layers previously developed, however, have poor solder wettability, although they have a sufficient adhesion strength to the AlN sintered bodies.

Poor solder wettability cause various problems as given below. When a semiconductor element is mounted onto an AlN sintered body via a metallized layer, poor solder wetting properties lower the efficiency of heat transfer from the semiconductor element to the AlN sintered body, thereby lowering the heat release from the AlN sintered body and causing the serious temperature rise of the semiconductor element. As a result, normal operations of the semiconductor element are made difficult. As another problem, for example, when a seal ring is joined to an AlN sintered body via a metallized layer, poor solder wettability easily form a leak path in the solder layer, thus reducing the hermeticity.

A conventional technique applied to improve the solder wettability is to form a plating layer on the metallized layer sufficiently thick, for example, 5 µm. This, however, increases the cost required for plating and causes the formation of a rough plating layer and solder spots on the plating layer, thereby damaging the heat dissipation properties of ICs mounted on the substrate.

The method disclosed in Japanese Patent Laid-Open No. 5-238857 allows the substrate to possess both the sufficient adhesion strength and favorable solder wettability by adding extremely expensive titanium hydride to the metallizing paste. This method, however, significantly increases the production cost.

SUMMARY OF THE INVENTION

One object of the invention is thus to provide a metallized ceramic substrate having a smooth plating layer and possessing sufficient adhesion strength and excellent solder wettability in which the problems encountered in the conventional processes mentioned above are overcome.

Another object of the invention is to provide a method for producing such a metallized ceramic substrate without requiring costly metallizing processes.

In view of the foregoing, the inventors have made intensive studies and found that a ceramic substrate having both excellent solder wettability and sufficient adhesion strength is obtained by forming a smooth metallized layer on the ceramic substrate and a smooth plating layer with a minimized surface roughness on the metallized layer. Based on the finding, there have been developed the metallized ceramic substrates of the present invention and the method of the production thereof.

In order to achieve the above objects, there is provided a metallized ceramic substrate having a smooth plating layer, which comprises:
- a ceramic substrate comprising aluminum nitride as a main component;
- a metallized layer formed on at least one face of the ceramic substrate and comprising at least one selected from the group consisting of tungsten and molybdenum as a main component; and
- a plating layer formed on the metallized layer and comprising nickel as a main component, wherein the nickel plating layer has a thickness of not greater than 2 µm and a surface roughness of not greater than 2 µm in terms of center-line mean roughness (Ra) specified in JIS (Japanese Industrial Standard).

In another aspect of the present invention, the plating layer in the foregoing metallized ceramic substrate may be constituted of a first plating layer which is formed on the metallized layer and comprises nickel as a main component and a second plating layer which is formed on the first plating layer and comprises gold as a main component. In this case, it is required that the first plating layer and the second plating layer have a thickness of not greater than 2 µm and a thickness of not greater than 1 µm, respectively, and the surface roughness (Ra) of the second layer should be 2 µm or less.

This invention is also directed to the production method of such metallized ceramic substrates having a smooth plating layer.

The first one is obtained by a production method comprising:
- applying a metallizing paste comprising at least one selected from the group consisting of tungsten and molybdenum as a main component onto at least one face of a green ceramic substrate (i.e., unsintered ceramic substrate) comprising aluminum nitride as a main component;
- placing a plate having a surface roughness of not greater than 0.7 µm in terms of Ra on the metallizing paste-applied face of the green ceramic substrate and flattening the metallizing paste-applied face under pressure;
- firing the ceramic substrate in a non-oxidizing atmosphere; and forming a plating layer comprising nickel as a main component onto the metallized layer formed on the ceramic substrate, the plating layer having a thickness of not greater than 2 μm and a surface roughness of not greater than 2 μm in terms of Ra.

In the production of the second type of metallized ceramic substrate, the above tungsten and/or molybdenum based metallizing paste is applied onto at least one face of the green ceramic substrate and flattening and firing processes are performed as described above. Thereafter, the first plating layer comprising nickel as a main component and having a thickness of not greater than 2 μm is formed onto the metallized layer of the substrate, and the second plating layer comprising gold as a main component and having a thickness of not greater than 1 μm and a surface roughness of not greater than 2 μm in terms of Ra is formed onto the first plating layer.

DETAILED DESCRIPTION OF THE PREFERRED EMBODIMENTS

According to the present invention, the aforestated metallized ceramic substrate having a smooth plating layer is produced by the method comprising applying a metallizing paste comprising at least one selected from the group consisting of tungsten and molybdenum as a main component onto at least one face of a green ceramic substrate comprising aluminum nitride as a main component to form a metallized layer; placing a plate having a surface roughness of not greater than 0.7 μm in terms of Ra onto at least one face with the metallizing paste applied thereon; flattening the metallizing paste-applied face of the ceramic substrate under pressure; firing the ceramic substrate with the smooth metallized layer thereon in a non-oxidizing atmosphere; and forming a nickel-based plating layer having a thickness of not greater than 2 μm and a surface roughness of not greater than 2 μm in terms of Ra on the metallized face of the aluminum nitride. If necessary, a gold-based plating layer of 1 μm or less in thickness and 2 μm or less in surface roughness (Ra) may be formed onto the nickel-based plating layer.

Essential features of the method according to the invention are that:

(1) the green ceramic substrate used in the invention has sufficiently low hardness, preferably a Rockwell hardness of 100 HRS or less;

(2) the flattening process is carried out on the metallizing paste-applied surface;

(3) the metallizing paste used in the invention has a small content of glass added; and (4) a plating layer formed on the substrate is sufficiently thin.

More specifically, the metallizing paste is applied onto the green ceramic substrate body by any known method, for example, screen printing or spin coating. The flattening treatment is then executed on the metallizing paste-applied surface to allow the roughness on the metallizing paste-applied surface to be absorbed by the plastic deforming ability of the green ceramic substrate body. The amount of glass, which may increase the surface roughness of the metallized face, is added in a suppressed amount to the metallizing paste, whereas the thickness of the plating layer is reduced to minimize the roughness of the plating layer, thereby making it possible to form a smooth plating layer on a flat metallized face.

When the conditions of the flattening treatment, the content of glass included in the metallizing paste, and the firing conditions are optimized, a metallized aluminum nitride substrate with a smooth plating layer can be obtained with a further increased adhesion strength and an excellent solder wettability.

The plate used for flattening the metallizing paste-applied face should have a surface roughness (measured with Ra) of not greater than 0.7 μm. If the surface roughness is greater than this upper limit, this results in insufficient flattening of the metallizing paste-applied surface, thereby causing difficulty to arise in obtaining the metallized aluminum nitride substrate having a smooth plating layer.

Possible materials for the plate include metals, resins, rubbers, and ceramics. Resins and rubbers preferably have a Rockwell hardness of not less than 50 HRS in a temperature range for the flattening process.

The preferable conditions for the flattening process is to apply pressure of not less than 15 kg/cm² onto the metallizing paste-applied face at a temperature of not lower than 15° C. Temperature and pressure less than these lower limits result in poor plastic flowability of the metallizing paste and insufficient flattening of the metallizing paste-applied surface, thereby making it difficult to obtain the metallized aluminum nitride substrate having a smooth plating layer.

The metallizing paste used in the method for producing the metallized aluminum nitride substrate of the invention comprises at least one selected from the group consisting of tungsten and molybdenum as a main component.

The glass component included in the metallizing paste is preferably not greater than 15 parts by weight with respect to the total of 100 parts by weight of tungsten powder and molybdenum powder. Even though the metallized substrate is flattened before firing, the glass component is fused and diffused during firing and the once-flattened metallized surface tends to become rough after the firing. A glass content exceeding the above limit results in significant roughness on the metallized layer, thereby making it difficult to obtain the metallized aluminum nitride substrate having a smooth plating layer.

The glass component included in the metallizing paste preferably contains at least one selected from the group consisting of CaO, MgO, $Al_2O_3$, $SiO_2$, $B_2O_3$, ZnO, PbO, oxides of rare earth metals, compounds to yield the above oxides by firing, and complex compounds thereof. Glass components other than the above oxides make it difficult to yield the metallized aluminum nitride substrate having a sufficient bond strength.

The temperature of firing in a non-oxidizing atmosphere preferably ranges from 1600° C. to 1950° C. The temperature other than this range makes it difficult to yield the metallized aluminum nitride substrate having a sufficient bond strength.

In the metallizing paste used in the present invention, at least one additive selected from the group consisting of nickel, iron, cobalt, their oxides, and their alloys may also be present in a total amount of 0.001 through 5 parts by weight with respect to the total of 100 parts by weight of tungsten powder and molybdenum powder. When the content of additives is outside this range, it is difficult to yield the metallized aluminum nitride substrate having sufficient adhesion strength.

The non-oxidizing atmosphere preferably includes hydrogen in a content of not greater than 10 percent by volume. A hydrogen content greater than 10 percent by volume leads to an excessive grain growth of tungsten and molybdenum and results in an undesirably large roughness on the metallized layer.

The plating layer formed on the metallized layer is a nickel plating layer or a combination of a nickel plating layer and a gold plating layer formed on the nickel plating layer. In the case of forming the nickel plating layer alone, the thickness of the nickel plating layer should be 2 μm or less and the surface roughness is 2 μm or less in Ra. In the case of forming a nickel plating layer and a gold plating layer on the nickel plating layer, it is required that the nickel plating layer and the gold plating layer have thicknesses of not greater than 2 μm and not greater than 1 μm, respectively, and the upper plating layer of gold have a surface roughness Ra of 2 μm or less. Even when a smooth metallized layer is formed, a thickness greater than this upper limit will result in undesirable roughness on the surface of the plating layer, thereby causing the difficulty in obtaining the metallized aluminum nitride substrate having a smooth plating layer. The thickness of the plating layer is measured on the central portion of the plated surface for excluding the thickness of possible abnormal deposits on the corners.

According to the production method described above, there is obtained the inventive metallized aluminum nitride substrate having a smooth plating layer.

The metallized aluminum nitride substrates of the invention have a smooth plating layer by applying a metallizing paste having a low glass content and a reduced content of coarse secondary particles; and by forming a flat metallized layer and a reduced plating thickness. The resultant metallized substrates have an excellent solder wettability. A high adhesion strength is also attained by selecting the optimum content of glass to be added to the metallizing paste and the optimum firing condition, as described previously with respect to the inventive production process.

The metallized ceramic substrate with a smooth plating layer according to the invention is preferably applied to semiconductor-mounting substrates in control devices of transport equipment with the requirement of high quake resistance, as well as to the substrates of computers.

This invention is described in detail by way of the following examples.

EXAMPLE 1

After 3 percent by weight of $Y_2O_3$ powder having an average particle diameter of 0.6 μm and 10 percent by weight of polymethacrylate used as an organic binder were added to AlN powder having an average particle diameter of 1.1 μm, the mixture was ground and mixed with a ball mill. Thus, a green AlN sheet of 50 mm×50 mm×0.6 mm was then prepared by the doctor blade method.

A metallizing paste was prepared by adding 0.5 parts by weight of iron powder having an average particle diameter of 25 μm, 1 part by weight of $Ca(NO_3)_2$ having an average particle diameter of 12 μm, 0.8 parts by weight of $\alpha$-$Al_2O_3$ having an average particle diameter of 4.6 μm, and 3 parts by weight of $SiO_2$ having an average particle diameter of 18 μm to 100 parts by weight of tungsten powder having an average particle diameter of 1.5 μm. The glass content in the metallizing paste was 4.8 parts by weight with respect to 100 parts by weight of tungsten.

The metallizing paste also contained 17 parts by weight of terpineol and 3.5 parts by weight of ethyl acetate as solvents and 8 parts by weight of ethyl cellulose as an organic binder with respect to 100 parts by weight of tungsten.

The metallizing paste thus prepared was applied onto the green AlN sheet by screen printing with a stainless steel screen of 200 mesh and emulsifier thickness of 20 μm. A flattening process was carried out after drying the AlN sheet with the metallizing paste.

The flattening process was implemented by placing a SUS 304 metal plate having a surface roughness (Ra) of 0.51 μm on the printing surface of the green sheet and applying a pressure of 30 kg/cm² onto the metal plate at a temperature of 75° C.

The sheet was allowed to be held in an atmosphere of nitrogen at 700° C. for 3 hours for the removal of the organic binder by volatilization and subsequently fired in an atmosphere of nitrogen at 1800° C. for 3 hours to yield a metallized AlN substrate. The dew point of the atmosphere was −56° C. during the firing process.

A nickel plating layer was then formed on the metallized AlN substrate by nickel-phosphorus electroless plating. The thickness of the nickel plating layer measured using fluorescence X-ray was 1.8 μm. The surface roughness (Ra) of the nickel plating layer was 0.9 μm.

The AlN metallized substrate with the nickel plating layer was dipped in solder (Sn: 60, Pb: 40) at a temperature of 230° C., and the solder wettability was evaluated by measuring the ratio of the solder wetted area to the plated surface area. The substrate of Example 1 showed excellent solder wettability; that is, 100% of the plated surface area was wetted with solder.

An annealed copper wire of 0.8 mmφ plated with Sn was soldered onto the solder-dipped surface of the substrate. The tensile strength was then measured for the purpose of evaluating the adhesion strength. The substrate of Example 1 had a sufficient adhesion strength of 4.3 kg/mm². Hereinafter, "tensile strength" is referred to as "adhesion strength".

Comparative Example 1

An AlN metallized substrate was prepared in the same manner as Example 1, except that no flattening process was carried out on the AlN sheet of Example 1.

A nickel plating layer of 1.9 μm in thickness having a surface roughness (Ra) of 2.2 μm was formed on the substrate as described in Example 1.

The AlN metallized substrate thus obtained was evaluated by measuring the solder wettability and the adhesion strength for the soldered annealed copper wire according to the method described in Example 1. Although having a sufficient adhesion strength of 4.5 kg/mm², the AlN metallized substrate of Comparative Example 1 had significantly poorer solder wettability, that is, only 38 area %, compared with 100 area % of Example 1.

EXAMPLE 2

AlN metallized substrates were prepared according to the method described in Example 1. A nickel plating layer of varying thickness was formed on each substrate by electrolytic plating, so that metallized ceramic substrates having nickel plating layers of varying thickness as specified in Table 1 were prepared. The metallized ceramic substrates thus obtained were evaluated for the solder wettability and the adhesion strength according to the evaluation procedures described in Example 1. The results of the evaluation are shown in Table 1.

TABLE 1

| Sample No. | Thickness of nickel plating layer [μm] | Surface roughness (Ra) [μm] | Solder wettability [%] | Adhesion strength [kgf/mm²] |
| --- | --- | --- | --- | --- |
| 1 | 0.3 | 0.5 | 92 | 3.7 |
| 2 | 0.7 | 0.5 | 95 | 3.8 |
| 3 | 1.0 | 0.6 | 100 | 4.1 |
| 4 | 1.5 | 0.7 | 100 | 4.8 |
| 5 | 1.8 | 0.9 | 100 | 4.3 |
| 6* | 2.5 | 2.5 | 63 | 3.1 |

*: Comparative Example

EXAMPLE 3

Ceramic metallized substrates having nickel plating layer of 1.8 μm in thickness were prepared according to the method described in Example 1. A gold plating layer of varying thickness was further formed on each substrate by electrolytic plating, so that metallized ceramic substrates having the nickel plating layer and the gold plating layer of varying thickness as specified in Table 2 were prepared. The metallized ceramic substrates thus obtained were evaluated for the solder wettability and the adhesion strength according to the evaluation procedures described in Example 1. The results of the evaluation are shown in Table 2.

TABLE 2

| Sample No. | Thickness of gold plating layer [μm] | Surface roughness (Ra) [μm] | Solder wettability [%] | Adhesion strength [kgf/mm²] |
|---|---|---|---|---|
| 7 | 0.3 | 1.2 | 93 | 4.5 |
| 8 | 0.9 | 1.4 | 90 | 4.6 |
| 9* | 1.5 | 2.8 | 58 | 3.3 |

*: Comparative Example

EXAMPLE 4

The metallizing paste was applied onto the green AlN sheets and dried according to the method described in Example 1. After the flattening process under the respective conditions specified in Table 3, which was followed by firing and plating, the metallized ceramic substrates obtained were evaluated for the solder wettability and the adhesion strength according to the method described in Example 1. The results are shown in Table 3.

ing temperature is not lower than 15° C., and the processing pressure was not less than 15 kg/cm².

EXAMPLE 5

Green sheet forms of varying hardness were prepared from the AlN powder, the $Y_2O_3$ powder, and the organic binder used in Example 1 by varying the grinding condition with a ball mill.

Application of the metallizing paste onto each sheet, drying, flattening, firing, nickel plating, and subsequent evaluation for the solder wettability and the adhesion strength were carried out according to the method described in Example 1. The results are shown in Table 4.

TABLE 4

| Sample No. | Hardness of green sheet [Rockwell hardness HRS] | Surface roughness (Ra) [μm] | Solder wettability [%] | Adhesion strength [kgf/mm²] |
|---|---|---|---|---|
| 30 | 80 | 0.8 | 100 | 4.1 |
| 31 | 98 | 0.9 | 100 | 4.3 |
| 32* | 100< (unmeasurable) | 2.5 | 54 | 3.3 |

*: Comparative Example

EXAMPLE 6

Green AlN sheets were prepared according to the method described in Example 1. Metallizing pastes were prepared with various amounts of glass added as specified in Table 5.

TABLE 3

| Sample No. | Surface roughness (Ra) [μm] | Plate used for flattening process Material | Temperature [°C.] | Pressure [kg/cm²] | Solder wettability [%] | Adhesion strength [kgf/mm²] |
|---|---|---|---|---|---|---|
| 10 | 0.1 | SUS 304 steel according to JIS | 75 | 30 | 100 | 4.8 |
| 11 | 0.1 | Alumina ceramic | 75 | 30 | 100 | 4.8 |
| 12 | 0.3 | Urethane rubber (hardness 60 HRS) | 75 | 30 | 100 | 4.7 |
| 13 | 0.5 | SUS 304 | 75 | 30 | 100 | 4.3 |
| 14 | 0.7 | Molybdenum | 75 | 30 | 97 | 4.3 |
| 15 | 0.7 | Aluminum | 75 | 30 | 95 | 4.2 |
| 16* | 0.8 | SUS 304 | 75 | 30 | 46 | 4.4 |
| 17* | 0.5 | SUS 304 | 10 | 30 | 65 | 4.5 |
| 18 | 0.5 | SUS 304 | 15 | 30 | 90 | 4.3 |
| 19 | 0.5 | SUS 304 | 20 | 30 | 96 | 4.8 |
| 20 | 0.5 | SUS 304 | 50 | 30 | 100 | 4.8 |
| 21 | 0.5 | SUS 304 | 75 | 30 | 100 | 4.3 |
| 22 | 0.5 | SUS 304 | 100 | 30 | 100 | 4.1 |
| 23 | 0.5 | SUS 304 | 125 | 30 | 100 | 4.3 |
| 24* | 0.5 | SUS 304 | 75 | 10 | 53 | 4.4 |
| 25 | 0.5 | SUS 304 | 75 | 15 | 89 | 5.0 |
| 26 | 0.5 | SUS 304 | 75 | 20 | 93 | 4.2 |
| 27 | 0.5 | SUS 304 | 75 | 30 | 100 | 4.3 |
| 28 | 0.5 | SUS 304 | 75 | 50 | 100 | 5.0 |
| 29 | 0.5 | SUS 304 | 75 | 75 | 100 | 4.6 |

*: Comparative Examples

As clearly seen in Table 3, superior results could be obtained both in solder wettability and adhesion strength when the surface roughness (Ra) of the plate used for the flattening process was not greater than 0.7 μm, the process- Application of each metallizing paste onto the green sheet, drying, flattening, firing, plating, and subsequent evaluation for the solder wettability and the adhesion strength were carried out according to the method described in Example 1. The results are shown in Table 5.

TABLE 5

| Sample No. | Amount of glass added [parts by weight] | Solder wettability [%] | Adhesion strength [kgf/mm²] |
|---|---|---|---|
| 33 | 0.1 | 100 | 4.7 |
| 34 | 0.5 | 100 | 4.5 |
| 35 | 1.1 | 100 | 4.7 |
| 36 | 2.9 | 100 | 4.6 |
| 37 | 4.8 | 100 | 4.3 |
| 38 | 10.0 | 98 | 5.1 |
| 39 | 15.0 | 91 | 4.8 |
| 40* | 20.2 | 55 | 4.9 |

*: Comparative Example

As clearly seen in Table 5, superior results were obtained both in solder wettability and adhesion strength under the condition that the amount of glass added was not greater than 15 parts by weight.

EXAMPLE 7

Green AlN sheets were prepared according to the method described in Example 1. Metallizing pastes were prepared with various compositions of glass as specified in Tables 6 and 7. Application of each metallizing paste onto the green sheet, drying, flattening, firing, plating, and subsequent evaluation for the solder wettability and the adhesion strength were carried out according to the method described in Example 1. The results are shown in Tables 6 and 7.

TABLE 6

| Sample No. | Ni [parts by weight] | Al₂O₃ [parts by weight] | Y₂O₃ [parts by weight] | SiO₂ [parts by weight] | Solder wettability (%) | Tensile strength [kgf/mm²] |
|---|---|---|---|---|---|---|
| 41 | 0.5 | 4 | 1 | | 100 | 4.1 |
| 42 | 0.5 | 2.5 | 2.5 | | 100 | 4.6 |
| 43 | 0.5 | 1 | 4 | | 100 | 5.2 |
| 44 | 0.5 | 3.3 | 1.5 | 0.3 | 100 | 4.3 |
| 45 | 0.5 | 2 | 2 | 1 | 100 | 4.7 |

TABLE 7

| Sample No. | Fe [parts by weight] | Al₂O₃ [parts by weight] | MgO [parts by weight] | SiO₂ [parts by weight] | Solder wettability (%) | Adhesion strength [kgf/mm²] |
|---|---|---|---|---|---|---|
| 46 | 0.5 | 2 | 2 | 1 | 100 | 5.1 |
| 47 | 0.5 | 2.5 | 1.5 | 1 | 100 | 5.0 |
| 48 | 0.5 | 3 | 1 | 1 | 100 | 4.7 |
| 49 | 0.5 | 3.5 | 0.5 | 1 | 100 | 4.5 |
| 50 | 0.5 | 1.5 | 2 | 1.5 | 100 | 5.3 |
| 51 | 0.5 | 1 | 2 | 2 | 100 | 5.1 |
| 52 | 0.5 | 2 | 2.5 | 0.5 | 100 | 4.8 |
| 53 | 0.5 | 2 | 0.5 | 2.5 | 100 | 4.5 |
| 54 | 0.5 | 2.5 | 2.3 | 0.3 | 100 | 4.5 |
| 55 | 0.5 | | 2.5 | 2.5 | 100 | 4.3 |
| 56 | 0.5 | 3.5 | 0.8 | 0.8 | 100 | 4.6 |
| 57 | 0.5 | 1 | 3.5 | 0.5 | 100 | 4.8 |

EXAMPLE 8

Green AlN sheets were prepared according to the method described in Example 1. Metallizing pastes were prepared with various amounts of Fe added as specified in Table 8. Application of each metallizing paste onto the green sheet, drying, flattening, firing, plating, and subsequent evaluation for the solder wettability and the adhesion strength were carried out according to the method described in Example 1. The results are shown in Table 8.

TABLE 8

| Sample No. | Amount of Fe added [parts by weight] | Solder wettability (%) | Adhesion strength [kgf/mm²] |
|---|---|---|---|
| 58* | 0.0005 | 76 | 3.6 |
| 59 | 0.001 | 93 | 4.3 |
| 60 | 0.01 | 100 | 5.0 |
| 61 | 0.1 | 100 | 5.2 |
| 62 | 0.5 | 100 | 4.9 |
| 63 | 1.0 | 100 | 4.5 |
| 64 | 5.0 | 100 | 4.1 |
| 65* | 10.0 | 100 | 1.9 |

*: Comparative Examples

As clearly seen in Table 8, superior results were obtained both in solder wettability and adhesion strength under the condition that the amount of Fe added ranged from 0.001 to 5 parts by weight with respect to 100 parts by weight of W.

While only tungsten was used as a main component in the metallizing paste compositions in the above Examples, similar good results can be obtained by using tungsten in combination with molybdenum or replacing tungsten with molybdenum according to the present invention.

As described above, the flattening process and the careful control of the metallizing paste composition according to the method of the invention enable metallized ceramic substrates having a smooth plating layer and possessing both favorable solder wettability and sufficient adhesion strength to be manufactured at a lower cost than the conventional method.

What is claimed is:

1. A metallized ceramic substrate having a smooth plating layer, said metallized ceramic substrate comprising:

a ceramic substrate comprising aluminum nitride as a main component and prepared from a green ceramic substrate with a Rockwell hardness of 100 HRS or lower;

a metallized layer formed on at least one face of said ceramic substrate wherein the metallized layer comprises at least one member selected from the group consisting of tungsten and molybdenum as a main component; 0.1 to 15 parts by weight of a glass component per 100 parts by weight of tungsten and molybdenum wherein the glass component is at least one selected from the group consisting of CaO, MgO, Al₂O₃, SiO₂, B₂O₃, ZnO, PbO, oxides of rare earth metals, compounds which yield the above listed oxides by firing, and complex compounds thereof; and 0.001 to 5 parts by weight of an additive per 100 parts by weight of tungsten and molybdenum wherein the additive is at least one selected from the group consisting of nickel, iron, cobalt, their oxides, and their alloys; and a plating layer formed on said metallized layer and comprising nickel as a main component, said nickel plating layer having a thickness of not greater than 2 μm and a surface roughness Ra of not greater than 2 μm.

2. A metallized ceramic substrate having a smooth plating layer, said metallized ceramic substrate comprising:

a ceramic substrate comprising aluminum nitride as a main component and prepared from a green ceramic substrate with a Rockwell hardness of 100 HRS or lower;

a metallized layer formed on a at least one face of said ceramic substrate wherein the metallized layer comprises at least one member selected from the group consisting of tungsten and molybdenum as a main component; 0.1 to 15 parts by weight of a glass component per 100 parts by weight of tungsten and molybdenum wherein the glass component is at least one selected from the group consisting of CaO, MgO, $Al_2O_3$, $SiO_2$, $B_2O_3$, ZnO, PbO, oxides of rare earth metals, compounds which yield the above listed oxides by firing, and complex compounds thereof; and 0.001 to 5 parts by weight of an additive per 100 parts by weight of tungsten and molybdenum wherein the additive is at least one selected from the group consisting of nickel, iron, cobalt, their oxides, and their alloys; and a first plating layer comprising nickel as a main component and formed on said metallized layer, said nickel plating layer has a thickness of not greater than 2 μm; and a second plating layer comprising gold as a main component and formed on said first plating layer, said gold plating layer having a thickness of not greater than 1 μm and a surface roughness Ra of not greater than 2 μm.

3. A method for producing a metallized ceramic substrate of claim 1 having a smooth plating layer, said method comprising:

applying a metallizing paste onto at least one face of a green ceramic substrate comprising aluminum nitride as a main component and having a Rockwell hardness of 100 HRS or less wherein the metallizing paste comprises at least one member selected from the group consisting of tungsten and molybdenum as a main component; 0.1 to 15 parts by weight of a glass component per 100 parts by weight of tungsten and molybdenum wherein the glass component is at least one selected from the group consisting of CaO, MgO, $Al_2O_3$, $SiO_2$, $B_2O_3$, ZnO, PbO, oxides of rare earth metals, compounds which yield the above listed oxides by firing, and complex compounds thereof; and 0.001 to 5 parts by weight of an additive per 100 parts by weight of tungsten and molybdenum wherein the additive is at least one selected from the group consisting of nickel, iron, cobalt, their oxides, and their alloys;

placing a plate having a surface roughness Ra of not greater than 0.7 μm onto said substrate and flattening said metallizing paste-applied face under pressure;

firing said substrate in a non-oxidizing atmosphere; and forming a plating layer comprising nickel as a main component onto the metallized layer, said plating layer having a thickness of not greater than 2 μm and a surface roughness Ra of not greater than 2 μm.

4. A method in accordance with claim 3, wherein said flattening process is implemented by applying a pressure of not less than 15 kg/cm² onto said metallizing paste-applied surface of said green ceramic substrate at a temperature of not lower than 15° C.

5. A method for producing a metallized ceramic substrate of claim 2 having a smooth plating layer, said method comprising:

applying a metallizing paste onto at least one face of a green ceramic substrate comprising aluminum nitride as a main component and having a Rockwell hardness of 100 HRS or less wherein the metallizing paste comprises at least one member selected from the group consisting of tungsten and molybdenum as a main component; 0.1 to 15 parts by weight of a glass component per 100 parts by weight of tungsten and molybdenum wherein the glass component is at least one selected from the group consisting of CaO, MgO, $Al_2O_3$, $SiO_2$, $B_2O_3$, ZnO, PbO, oxides of rare earth metals, compounds which yield the above listed oxides by firing, and complex compounds thereof; and 0.001 to 5 parts by weight of an additive per 100 parts by weight of tungsten and molybdenum wherein the additive is at least one selected from the group consisting of nickel, iron, cobalt, their oxides, and their alloys;

placing a plate having a surface roughness Ra not greater than 0.7 μm onto said metallizing paste-applied face of said green ceramic substrate and flattening said metallizing paste-applied face under pressure;

firing said substrate in a non-oxidizing atmosphere;

forming a first plating layer comprising nickel as a main component onto the metallized layer, said first plating layer having a thickness of not greater than 2 μm; and forming a second plating layer comprising gold as a main component onto the said first plating layer, said second plating layer having a thickness of not greater than 1 μm and a surface Ra of not greater than 2 μm.

6. A method in accordance with claim 5, wherein said flattening process is implemented by applying a pressure of not less than 15 kg/cm² onto said metallizing paste-applied surface of said green ceramic substrate at a temperature of not lower than 15° C.

* * * * *